US007267174B2

(12) United States Patent
Gonsveld et al.

(10) Patent No.: US 7,267,174 B2
(45) Date of Patent: Sep. 11, 2007

(54) METHODS OF PLUGGING A PERMEABLE ZONE DOWNHOLE USING A SEALANT COMPOSITION COMPRISING A CROSSLINKABLE MATERIAL AND A REDUCED AMOUNT OF CEMENT

(75) Inventors: Jan Gonsveld, Rijswijk (NL); Fred Arkestiejn, Rijswijk (NL); Diederik W. van Batenburg, Delft (NL); Jip van Eijden, Rijswijk (NL)

(73) Assignees: Halliburton Energy Services, Inc., Duncan, OK (US); Shell International Exploration and Production B.V., Rijswijk (NL)

( * ) Notice: Subject to any disclaimer, the term of this patent is extended or adjusted under 35 U.S.C. 154(b) by 234 days.

(21) Appl. No.: 11/041,577

(22) Filed: Jan. 24, 2005

(65) Prior Publication Data
US 2006/0162930 A1   Jul. 27, 2006

(51) Int. Cl.
*E21B 33/138*   (2006.01)
(52) U.S. Cl. ...................................... 166/293; 166/300
(58) Field of Classification Search .................... None
See application file for complete search history.

(56) References Cited

U.S. PATENT DOCUMENTS

| | | | |
|---|---|---|---|
| 2,805,719 A | 9/1957 | Anderson ..................... 166/29 |
| 3,793,244 A | 2/1974 | Megee | |
| 3,835,926 A | 9/1974 | Clement, Jr. ................. 166/292 |
| 3,928,052 A | 12/1975 | Clement, Jr. ................. 106/76 |
| 3,967,681 A | 7/1976 | Curzon ....................... 166/277 |
| 4,480,693 A | 11/1984 | Newlove et al. ............. 166/293 |
| 4,515,635 A | 5/1985 | Rao et al. ..................... 106/90 |
| 4,537,918 A | 8/1985 | Parcevaux et al. .......... 523/130 |
| 4,555,269 A | 11/1985 | Rao et al. ..................... 106/90 |
| 4,582,139 A * | 4/1986 | Childs et al. ................ 166/293 |
| 4,629,747 A | 12/1986 | Wu et al. | |
| 4,683,949 A | 8/1987 | Sydansk et al. | |
| 4,721,160 A | 1/1988 | Parcevaux .................... 166/293 |
| 4,761,183 A | 8/1988 | Clarke ......................... 106/117 |
| 4,767,460 A | 8/1988 | Parcevaux et al. ............ 106/90 |
| 4,861,822 A | 8/1989 | Keskey et al. | |
| 5,086,850 A | 2/1992 | Harris et al. .................. 175/61 |
| 5,121,795 A | 6/1992 | Ewert et al. ................. 166/293 |
| 5,123,487 A | 6/1992 | Harris et al. ................. 166/277 |
| 5,125,455 A | 6/1992 | Harris et al. ................. 166/292 |
| 5,127,473 A | 7/1992 | Harris et al. ................. 166/277 |
| 5,146,986 A | 9/1992 | Dalrymple .................... 166/294 |
| 5,159,980 A | 11/1992 | Onan et al. | |
| 5,181,568 A | 1/1993 | McKown et al. ............ 166/293 |
| 5,238,064 A | 8/1993 | Dahl et al. ................... 166/293 |
| 5,293,938 A | 3/1994 | Onan et al. .................. 166/293 |
| 5,296,627 A | 3/1994 | Tang et al. | |
| 5,332,037 A | 7/1994 | Schmidt et al. .............. 166/276 |
| 5,335,726 A | 8/1994 | Rodrigues ................... 166/295 |
| 5,338,726 A | 8/1994 | Shiosaki et al. | |
| 5,340,860 A | 8/1994 | Brake et al. ................. 524/166 |
| 5,358,051 A | 10/1994 | Rodrigues .................... 166/295 |
| 5,377,757 A | 1/1995 | Ng ............................... 166/277 |
| 5,563,201 A | 10/1996 | Joanicot et al. | |
| 5,588,488 A | 12/1996 | Vijn et al. | |
| 5,688,844 A | 11/1997 | Chatterji et al. ................ 524/8 |
| 5,779,787 A | 7/1998 | Brothers et al. ............. 106/802 |
| 5,836,392 A | 11/1998 | Urswin-Smith .............. 166/295 |
| 5,850,880 A | 12/1998 | Moran et al. ................ 166/293 |
| 5,900,451 A | 5/1999 | Krishnan et al. | |
| 5,913,364 A | 6/1999 | Sweatman ................... 166/281 |
| 5,945,387 A | 8/1999 | Chatterji et al. ............ 507/224 |
| 5,948,344 A | 9/1999 | Cusick et al. | |
| 6,060,434 A | 5/2000 | Sweatman et al. .......... 507/216 |
| 6,130,287 A | 10/2000 | Krishnan | |
| 6,167,967 B1 | 1/2001 | Sweatman ................... 166/281 |
| 6,176,315 B1 | 1/2001 | Reddy et al. ................ 166/295 |
| 6,182,758 B1 | 2/2001 | Vijn ............................ 166/293 |
| 6,187,839 B1 | 2/2001 | Eoff et al. | |

(Continued)

FOREIGN PATENT DOCUMENTS

EP       0 145 151       10/1984

(Continued)

OTHER PUBLICATIONS

Halliburton brochure entitles "Halad® -344 Fluid-Loss Additive" dated 1998.

(Continued)

*Primary Examiner*—Zakiya W. Bates
(74) *Attorney, Agent, or Firm*—Robert A. Kent; Conley, Rose, P.C.

(57) ABSTRACT

A method of servicing a wellbore, comprising preparing a sealant composition comprising a crosslinkable material, a crosslinking agent, a fluid loss control additive, and water, placing the sealant composition in a permeable zone in the wellbore, and allowing the sealant composition to set. A method of servicing a wellbore, comprising preparing a sealant composition by combining a crosslinkable material, a crosslinking agent, a fluid loss control additive, water, and a cement, wherein an amount of the cement is reduced to an effective amount to increase a gel time of the sealant composition to greater than or equal to about 4 hours when the sealant composition is exposed to ambient temperatures in the wellbore, placing the sealant composition in a permeable zone in the wellbore, and allowing the sealant composition to gel.

22 Claims, 2 Drawing Sheets

U.S. PATENT DOCUMENTS

| | | | |
|---|---|---|---|
| 6,192,986 B1 | 2/2001 | Uslwin-Smith | 166/295 |
| 6,196,317 B1 | 3/2001 | Hardy | 166/295 |
| 6,218,343 B1 | 4/2001 | Burts, Jr. | |
| 6,258,757 B1 | 7/2001 | Sweatman et al. | 507/219 |
| 6,312,515 B1 | 11/2001 | Barlet-Gouedard et al. | 106/709 |
| 6,321,841 B1 | 11/2001 | Eoff et al. | |
| 6,457,524 B1 | 10/2002 | Roddy | 166/293 |
| 6,497,283 B1 | 12/2002 | Eoff et al. | 166/293 |
| 6,508,306 B1 | 1/2003 | Reddy et al. | |
| 6,590,050 B1 | 7/2003 | Bair et al. | 526/240 |
| 6,607,035 B1 | 8/2003 | Reddy et al. | |
| 6,626,992 B2 | 9/2003 | Vijn et al. | 106/726 |
| 6,656,266 B1 | 12/2003 | Barlet-Gouedard et al. | 106/802 |
| 6,702,044 B2 | 3/2004 | Reddy et al. | 175/64 |
| 6,722,433 B2 | 4/2004 | Brothers et al. | |
| 6,743,288 B2 | 6/2004 | Eoff et al. | 106/724 |
| 6,764,981 B1 | 7/2004 | Eoff et al. | |
| 6,766,858 B2 | 7/2004 | Nguyen et al. | 166/300 |
| 6,770,604 B2 | 8/2004 | Reddy et al. | 507/224 |
| 6,822,061 B2 | 11/2004 | Eoff et al. | 526/287 |
| 6,823,940 B2 | 11/2004 | Reddy et al. | 166/295 |
| 6,837,316 B2 | 1/2005 | Reddy et al. | 175/64 |
| 6,843,841 B2 | 1/2005 | Reddy et al. | 106/162.2 |
| 6,936,574 B2 | 8/2005 | Dao et al. | |
| 6,951,250 B2 | 10/2005 | Reddy et al. | |
| 2003/0213593 A1 | 11/2003 | Bouwmeester et al. | |
| 2003/0224946 A1 | 12/2003 | Verlaan et al. | 507/200 |
| 2004/0020650 A1 | 2/2004 | Burts, III | |
| 2004/0023813 A1 | 2/2004 | Burts, III | |
| 2004/0035580 A1 | 2/2004 | Bouwmeester et al. | 166/295 |
| 2004/0182576 A1 | 9/2004 | Reddy et al. | |
| 2004/0226717 A1 | 11/2004 | Reddy et al. | 166/295 |
| 2005/0159319 A1 | 7/2005 | Eoff et al. | 507/225 |
| 2005/0167106 A1 | 8/2005 | Reddy et al. | |
| 2005/0197257 A1 | 9/2005 | Bouwmeester | 507/120 |
| 2005/0230112 A1 | 10/2005 | Reddy et al. | |
| 2005/0230113 A1 | 10/2005 | Eoff et al. | |
| 2005/0288190 A1 | 12/2005 | Dao et al. | |
| 2006/0086503 A1* | 4/2006 | Reddy et al. | 166/293 |
| 2006/0122071 A1 | 6/2006 | Reddy et al. | 507/219 |

FOREIGN PATENT DOCUMENTS

| | | |
|---|---|---|
| EP | 0 566 118 B2 | 10/2001 |
| EP | 1201874 A2 | 5/2002 |
| EP | 1369401 A2 | 12/2003 |
| GB | 2296713 | 7/1996 |
| WO | WO 99/02464 | 1/1999 |
| WO | WO 2005/078235 A1 | 8/2005 |
| WO | WO 2005/100739 A1 | 10/2005 |

OTHER PUBLICATIONS

Halliburton brochure entitled "Latex 2000 Cement Additive" dated 1998.

Halliburton brochure entitled "MICROSAND Cement Additive" dated 1999.

Halliburton brochure entitled "The PermSeal™ System, Versatile, Cost-Effective Sealants for Conformance Applications" dated 2002.

Halliburton brochure entitled "SSA-1 Strength-Stabilizing Agent" dated 1998.

Halliburton brochure entitled "SSA-2 Coarse Silica Flour" dated 1999.

SPE 20038 entitled "Small-Particle-Size Cement" by D.P. Ewert et al., dated 1991.

American Petroleum Institute Specification entitled "Specification for Materials and Testing for Well Cements", API Specification 10, Fifth Edition, Jul. 1, 1990.

Foreign Search Report and Written Opinion for International Application No. PCT/GB2006/000001, Mar. 1, 2006.

Search Report and Written Opinion of International Application No. PCT/GB2007/000135 mailed on May 2, 2007 and filed on Jan. 17, 2007.

* cited by examiner

METHODS OF PLUGGING A PERMEABLE ZONE DOWNHOLE USING A SEALANT COMPOSITION COMPRISING A CROSSLINKABLE MATERIAL AND A REDUCED AMOUNT OF CEMENT

CROSS-REFERENCE TO RELATED APPLICATIONS

This application is related to commonly owned U.S. patent application Ser. No. 11/041,554. entitled "A Sealant Composition Comprising a Crosslinkable Material and a Reduced Amount of Cement for a Permeable Zone Downhole," filed Jan. 24, 2005 and incorporated by reference herein.

FIELD OF THE INVENTION

The present invention generally relates to subterranean zonal isolation, and more particularly to methods of plugging a permeable zone in a wellbore using a sealant composition comprising a crosslinkable material and a reduced amount of cement.

BACKGROUND OF THE INVENTION

A technique known as squeeze or remedial cementing is a common operation in the petroleum industry. Most squeezes are performed with a drilling or workover rig and through threaded tubing or drillpipe. Squeeze cementing is most often performed to repair leaks in well tubulars and restore pressure integrity to the wellbore, raise the level of or restore a cement sheath behind the casing to support or protect well tubulars, modify the production or injection profile of a well by sealing unwanted production or thief zones, or repair a poor primary cement job before well completion. Squeeze cementing coupled with coiled tubing has been a standard remediation technique for shutting of unwanted gas or water production. Cement is able to fill perforation tunnels, channels behind pipe, and/or washout zones behind pipe, and consequently cement is able to provide a near wellbore block to production. Production from selected zones can then be reestablished by reperforating these zones. Unfortunately, cement has limitations as it does not penetrate into the porous rock. Microchannels along the cement and porous rock interface often develop due to cyclical changes in underground pressures and temperatures during subsequent production and shut-in stages.

Polymer gels are also used for shutting of unwanted gas or water production and can be placed by bullheading or can be selectively placed through coiled tubing. The main difference with squeeze cementing is that the polymer gels provide in depth blockage by penetrating the porous media and crosslinking in situ. The in situ properties of these gels can be varied from flowing gels to ringing gels by adjusting the polymer concentration, the polymer molecular weight, and/or the type of crosslinker. A limitation of gels is that they may not have the mechanical properties to provide sufficient resistance to flow in the absence of a porous medium, for example in areas such as voids and cavities behind pipe.

A logical solution to the limitations outlined above is to combine polymer gels with cement squeezes to effectively block to production through the porous medium, perforations, voids and/or cavities. This combination is typically conducted sequentially: first the polymer gel is placed in the formation and the treatment is completed with a cement tail-in to squeeze the perforations and any voids and cavities behind pipe. A disadvantage of the sequential combination treatment may be that the depth of polymer invasion in the porous media extends beyond the depths that can be penetrated by perforating guns and consequently the shut-off may be permanent.

Another approach to combining squeeze cementing and polymer gel technology for shutting of unwanted gas or water production is to use the polymer gel as the "mix water" for the cement slurry. The limited and controlled leak off of the polymer gel into the porous medium during the squeeze enables a controlled depth of invasion. US Patent Application Publication 2003/0224946 A1, incorporated herein by reference in its entirety, discloses compositions that can be used for this combined gel-cement technique. One composition includes a crosslinkable material, e.g., $H_2$ZERO polymer sold by Halliburton Energy Services of Duncan, Okla., for improving the strength of the composition when it sets such that it can withstand the pressures exerted by fluids in the subterranean formation. However, due to the alkalinity of the cement, which typically has a pH greater than 12, the gel time of the cement composition at the relatively high temperatures in the wellbore may be unacceptably short. The gel time refers to the period of time from initial mixing of the components in the cement composition to the point when a gel is formed. At this point, the viscosity of the cement composition is so high that it is no longer pumpable and thus does not reach the permeable zone where its placement is intended. A need therefore exists to reduce the gel time of such squeeze sealant compositions, thus ensuring that they can be properly placed in permeable zones downhole to prevent fluids from flowing into the wellbore.

SUMMARY OF THE INVENTION

Disclosed herein is a method of servicing a wellbore, comprising preparing a sealant composition comprising a crosslinkable material, a crosslinking agent, a fluid loss control additive, and water, placing the sealant composition in a permeable zone in the wellbore, and allowing the sealant composition to set. Also disclosed herein is a method of servicing a wellbore, comprising preparing a sealant composition by combining a crosslinkable material, a crosslinking agent, a fluid loss control additive, water, and a cement, wherein an amount of the cement is reduced to an effective amount to increase a gel time of the sealant composition to greater than or equal to about 4 hours when the sealant composition is exposed to ambient temperatures in the wellbore, placing the sealant composition in a permeable zone in the wellbore, and allowing the sealant composition to gel.

DETAILED DESCRIPTION OF THE PREFERRED EMBODIMENTS

Figure 1:
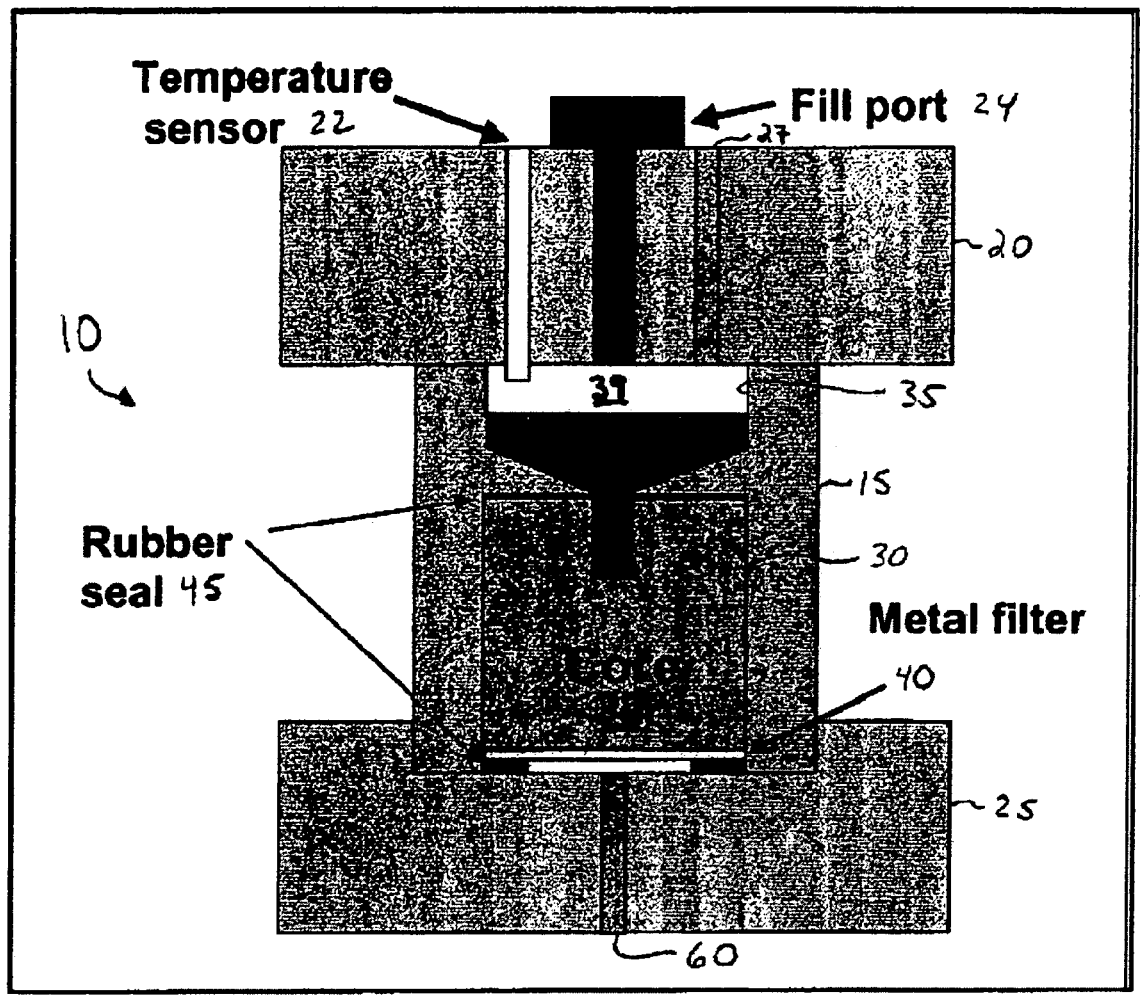
FIG. 1 is a schematic diagram of a stainless steel test cell used in the Examples.

Sealant compositions for plugging permeable zones in a wellbore include at least one crosslinkable material, at least one fluid loss control additive, water, and a reduced amount of cement relative to a conventional cement composition containing the same components except for the cement, for example a cement composition disclosed in U.S. Patent Application Publication No. 2003/0224946 A1, filed Jun. 4, 2002, and incorporated by reference herein in its entirety. The amount of cement in the sealant compositions is reduced by an effective amount to lengthen the gel time of the sealant compositions to greater than or equal to about 4 hours when the composition is exposed to ambient temperatures in the wellbore. In an embodiment, the gel time is in a range of from about 4 hours to about 12 hours, alternatively, from about 4 to about 8 hours, alternatively, from about 4 to about 6 hours. In particular, the amount of cement present in the sealant compositions may be in a range of from about 0% to about 50% by weight of the sealant composition. Thus, cementless sealant compositions are contemplated in one embodiment. As used herein, gel time is defined as the period of time from initial mixing of the components in the sealant composition to the point when a gel is formed. Further, as used herein, a gel is defined as a crosslinked polymer network swollen in a liquid medium.

In embodiments comprising cement, any suitable cement known in the art may be used in the sealant compositions. An example of a suitable cement includes hydraulic cement, which comprises calcium, aluminum, silicon, oxygen, and/or sulfur and which sets and hardens by reaction with water. Examples of hydraulic cements include, but are not limited to a Portland cement, a pozzolan cement, a gypsum cement, a high alumina content cement, a silica cement, a high alkalinity cement, or combinations thereof. Preferred hydraulic cements are Portland cments of the type described in American Petroleum Institute (API) Specification 10, $5^{th}$ Edition, Jul. 1, 1990, which is incorporated by reference herein in its entirety. The cement may be, for example, a class A, B, C, G, or H Portland cement. Another example of a suitable cement is microfine cement, for example, MICRODUR RU microfine cement available from Dyckerhoff GmBH of Lengerich, Germany.

Examples of suitable crosslinkable materials include but are not limited to the following: a water soluble copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from acrylamide-2-methylpropane sulfonic acid, N-vinylpyrrolidone, or both; or combinations thereof. The sealant compositions may also include at least one crosslinking agent, which is herein defined as a material that is capable of crosslinking such copolymers to form a gel. The crosslinking agent may be, for example, an organic crosslinking agent such as a polyalkyleneimine, a polyfunctional aliphatic amine, an aralkylamine, or a heteroaralkylamine. The amount of the crosslinkable material present in the sealant composition may be in a range of from about 1% to about 5% by weight of the sealant composition. The amount of the crosslinking agent may be in a range of from about 0.1% to about 5% by weight of the sealant compositions. A description of such copolymers and crosslinking agents can be found in U.S. Pat. Nos. 5,836,392, 6,192,986, and 6,196,317, each of which is incorporated by reference herein in its entirety. In an embodiment, the crosslinkable material is a copolymer of acrylamide and t-butyl acrylate, and the crosslinking agent is polyethylene imine. These materials are commercially available in a single $H_2$ZERO system sold by Halliburton Energy Services of Duncan, Okla.

Additional examples of suitable crosslinkable materials include but are not limited to self-crosslinking, water soluble hydroxy unsaturated carbonyl monomers and water soluble, vinyl monomers. These monomers may be used in combination with a crosslinking agent, for example a suitable initiator such as an azo compound that is temperature activated over a range of temperatures. As used herein, an initiator is defined as a compound that is capable of forming free radicals that initiate polymerization of self-crosslinking monomers. Further, the vinyl monomers may also be used in combination with crosslinking agents such as multifunctional, vinyl monomers. The amount of the crosslinkable material present in the sealant composition may be in a range of from about 1% to about 5% by weight of the sealant composition. The amount of the crosslinking agent may be in a range of from about 0.05% to about 2% by weight of the sealant compositions. A description of such crosslinkable materials, and initiators, can be found in U.S. Pat. Nos. 5,358,051 and 5,335,726, each of which is incorporated by reference herein in its entirety. In an embodiment, the crosslinkable material is 2-hydroxy ethyl acrylate monomer, and the initiators used therewith are different AZO-compounds. These materials are commercially available in a single PERMSEAL system sold by Halliburton Energy Services.

The water employed in the sealant compositions may be fresh water or salt water, e.g., an unsaturated aqueous salt solution or a saturated aqueous salt solution such as brine or seawater. The amount of water present in the sealant compositions is sufficient to form a pumpable slurry. In an embodiment, the amount of water may be in a range of from about 25% to about 75% by weight of the sealant composition.

Any suitable fluid loss control additives known in the art may be used, for example polymer fluid loss control additives, particulate fluid loss control additives, or combinations thereof. Examples of suitable fluid loss control additives are disclosed in U.S. Pat. Nos. 5,340,860, 6,626,992, 6,182,758, each of which is incorporated by reference herein in its entirety. In an embodiment, and in particular in an embodiment where the sealant composition comprises cement, the fluid loss control additives included in the sealant compositions are a copolymer of acrylamido-2-methylpropanesulfonate and N,N dimethylacrylamide, e.g., HALAD-344 fluid loss control additive also sold by Halliburton Energy Services, and a particulate matter such as silica flour, silica fume, sodium silicate, microfine sand, iron oxides, manganese oxides, barite, calcium carbonate, ground nut shells, ground wood, ground corncobs, mica, ceramics, ground tires, ground glass, ground drill cutting, etc., or mixtures of these. In an embodiment, and in particular in an embodiment where the sealant composition does not comprise cement, the fluid loss control additives included in the sealant composition may comprise, for example, natural and/or derivatized polysaccharides like galactomannan gums (guar gum, guar derivatives, etc), biopolymers, modified celluloses or combinations thereof in addition to or in lieu of the fluid loss control additives listed in the preceding sentence. The particulate matter preferably has a particle size between 0.5 and 150 microns. A suitable commercially available particulate matter is SSA-1 silica flour sold by Halliburton Energy Services. In embodiments comprising polymer fluid loss additives, particulate fluid loss additives, or combinations thereof, the amount of the particulate fluid loss additive in the sealant composition may be in the range from about 30 to about 70% by weight of the sealant composition and the amount of polymer fluid loss control additive present in the sealant composition may be in a range of from about 0.1% to about 3% by weight of the sealant composition.

Moreover, the sealant compositions may include one or more gel retarders. The amount of gell retarder present in the sealant composition may be in a range of from about 0% to about 5% by weight of the sealant composition. A suitable gel retarder is available from Halliburton Energy Services under the tradename FDP-S727-04.

In an embodiment, the gel retarder may be a formate compound, e.g., water soluable formate, for contributing to the reduction in the gel time of the crosslinkable material as described in US patent application publication 2004/0035580, filed Jun. 5, 2002, and incorporated by reference herein in its entirety. The amount of the formate compound present in the sealant composition is in a range of from about 0% to about 5% by weight of the sealant composition. Examples of suitable water-soluble formates include ammonium formate, lithium formate, sodium formate, potassium formate, rubidium formate, cesium formate, francium formate, and combinations thereof.

Moreover, the sealant compositions may include a gel retarder as described in U.S. patent application Ser. No. 10/875,649, filed Jun. 24, 2004, and incorporated by reference herein in its entirety. In an embodiment, the gel retarder is comprised of a chemical compound that is capable of acetylating an organic amine and/or slowly hydrolyzing or thermolyzing to produce one or more acids in the sealant composition. The compounds retard the cross-linking of the sealant composition at high temperatures, i.e., temperatures above about 200° F., for a period of time sufficient to place the sealant composition in the subterranean formation or zone in which the permeability is to be reduced. Examples of gel retarder chemical compounds that is capable of acetylating an organic amine and/or slowly hydrolyzing or thermolyzing to produce one or more acids that can be utilized in accordance with the present invention include, but are not limited to, anhydrides such as acetic or propionic anhydride, esters such polylactate, amides such as proteins and polyamides, imides such as polysuccinimide, polyacids such as polyaspartic acid polyglutamic acids and their salts. Of these, polysuccinimide or polyaspartic acid are preferred. Polysuccinimide hydrolyzes or thermolyzes in water to produce iminodisuccinic acid, polyaspartic acid or aspartic acid.

Optionally, the sealant compositions may include a latex comprising a styrene/butadiene copolymer suspended in water to form an aqueous emulsion. Examples of suitable latexes are described in U.S. Pat. No. 5,688,844, which is incorporated by reference herein in its entirety. In an embodiment, the styrene/butadiene copolymer latex is LATEX 2000 emulsion sold by Halliburton Energy Services. The weight ratio of the styrene to butadiene in LATEX 2000 emulsion is about 25:75, and the amount of the copolymer in the LATEX 2000 emulsion is about 50% by weight of the aqueous emulsion. In addition, the sealing compositions may optionally include a stabilizer such as $C_{15}$ alcohol ethoxylated with 40 moles of ethylene oxide, which is commercially available from Halliburton Energy Services under the tradename 434C stabilizer.

As deemed appropriate by one skilled in the art, additional additives may be added to the sealant compositions for improving or changing the properties thereof. Examples of such additives include but are not limited to set retarding agents, set accelerating agents, dispersing agents, strength retrogression control agents, viscosifying agents, and formation conditioning agents. The sealant compositions may further include a clay stabilizer for inhibiting damage to the subterranean formation during injection. The amount and type of clay stabilizer may be selected as deemed appropriate by one skilled in the art.

Methods of using the foregoing cement compositions first include preparing the compositions. They may be made by combining all of the components in any order and thoroughly mixing the components in a manner known to those skilled in the art. In an embodiment, the crosslinkable material, the water, and the cement, if any, are combined first, followed by the addition of the fluid loss control additives and any other additives. In an embodiment, the cement compositions are prepared immediately prior to use to ensure that they do not form a gel before reaching permeable zones in the wellbore.

Subsequently, the foregoing sealant compositions may be placed in the permeable zones to improve the zonal isolation of a subterranean formation penetrated by the wellbore. As used herein, a permeable zone is defined as an area in the wellbore through which a fluid can undesirably flow, wherein the permeable zone may be present in a conduit disposed in the wellbore, a cement column disposed in the annulus of the wellbore between the conduit and the wall of the wellbore, a microannulus interposed between the cement column and the conduit, a microannulus interposed between the cement column and the wall of the wellbore, or combinations thereof. Examples of such permeable zones include perforations such as those formed by a perforation gun, fissures, cracks, fractures, streaks, flow channels, voids, high permeability streaks, annular voids, or combinations thereof.

In an embodiment, a cement squeezing technique is employed to force a sealant composition into at least one permeable zone. As indicated previously, the sealant composition has a gel time greater than or equal to about 4 hours, for example, in a range of from about 4 hours to about 12 hours when it is exposed to ambient temperatures in a wellbore. Ambient downhole temperatures typically range from about 50° C. to about 175° C. As such, the composition remains pumpable for a sufficient amount of time to allow it to be squeezed into the permeable zone despite being exposed to relatively high temperatures. After placement in the permeable zone, the sealant composition is allowed to set into a rigid mass, thereby plugging the permeable zone such that fluids, e.g., water, most likely cannot pass through the permeable zone to the subterranean formation. Thus, the sealant composition effectively seals the subterranean formation from outside contaminants.

EXAMPLES

Figure 2:
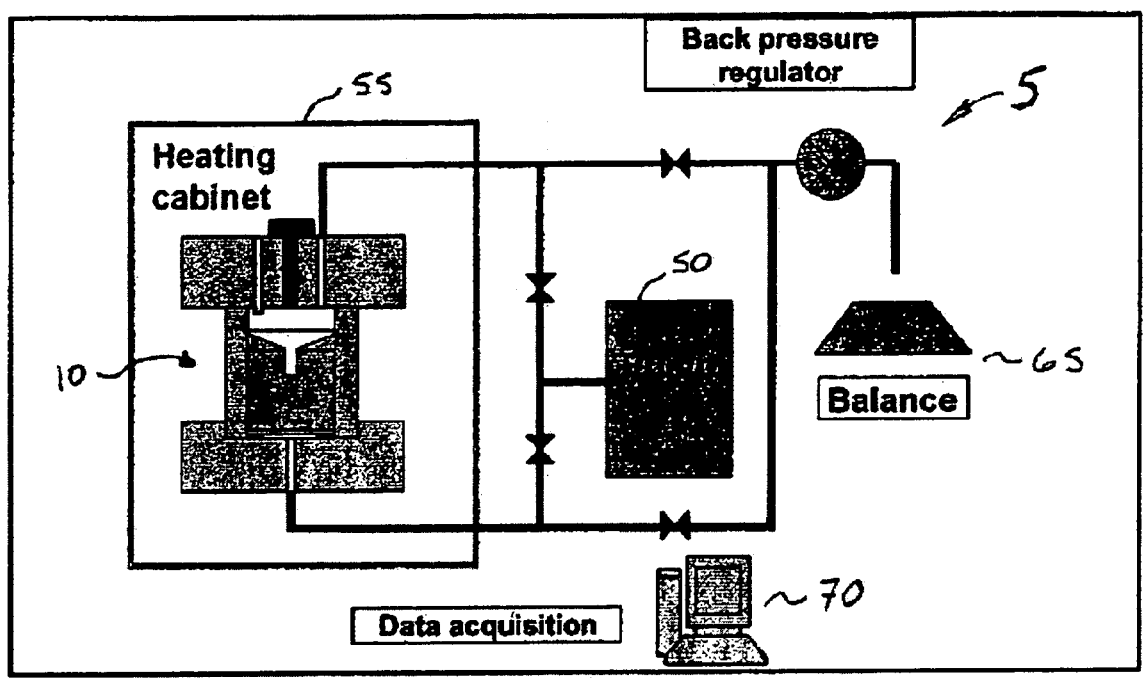
FIG. 2 is a schematic diagram of a sample test system incorporating the cell of FIG. 1.

The fluid leak off properties were measured in a custom built system 5 as depicted in FIGS. 1 and 2. The stainless steel cell 10 has a body 15 disposed between an upper housing 20 and a lower housing 25. The upper housing has a temperature sensor 22, a fill port 24, and a pressure port 27. The body 15 has a central chamber 30 holding a sample of core sample 32 on top of a metal filter 40. The core sample 32 simulates the permeability of a downhole formation. Rubber seals 45 provide a seal between the core sample 32 and the upper housing 20 and lower housing 25. A fluid reservoir 35 containing a sealant composition 37 and a liquid 39 is disposed above the core sample 32. The sealant composition 37 is placed in the reservoir 35 via fill port 24, followed by the liquid 39. The liquid 39 is pressurized via pressure port 27 using pump 50, as shown in FIG. 2. The steel cell 10 may be place in a heating cabinet 55, and the combination of heat and pressure provided by heating cabinet 55 and pump 50 may be used to simulate downhole conditions. Sealant composition 37 permeating the core sample 32 exits the steel cell 10 via exit port 60 in lower housing 25, and may be recovered an measured using balance 65. The system may be controlled and data acquired via computer 70.

Shut off properties of the sealant composition were measured using a system as depicted in FIGS. 1 and 2. The steel cell 10 was placed in a heating cabinet and could be operated at 130° C. and 200 bars. Fluid loss was measured on core sample 32, which was sandstone with a permeability in the range from 200-1000 mD. A small hole (8 mm ID) was drilled into the core sample to mimic a perforation. The cement slurry, i.e., sealant composition 37, conditioned at 80° C. was poured into the fill port 24 while the cell was at 80° C. Squeeze pressures of up to 80 bars were applied with a back pressure of 10 bars. Fluids were collected from the exit port 60 and fluid loss was recorded over time. API fluid loss (ml/30 minutes) was calculated by correcting for the area of the perforation.

In a controlled squeeze the fluid leak off penetrated the core approximately 2 cm. Subsequently the temperature of the heating cabinet was raised to the required value while maintaining an absolute pressure of 10 bars. The sealant was allowed to cure for 24 to 48 hours. After the cure pressure was stepwise increased from the back-side (reverse flow) and flow was monitored. Pressure was increased until maximum operating pressure of the set-up was reached (200 bars) or when pumps could not maintain pressure with the observed flow.

|  |  | Experiment | | |
| --- | --- | --- | --- | --- |
|  |  | #1 | #2 | #3 |
| Composition | | | | |
| Fresh water | w/w % | 22.3% | 19.9% | 19.9% |
| HZ-10 | w/w % | 13.2% | 11.9% | 11.9% |
| HZ-20 | w/w % | 0.9% | 1.0% | 1.0% |
| KCl | w/w % | 0.5% | 0.4% | 0.4% |
| FDP-S727-04 | w/w % | 0.2% | 0.2% | 0.2% |
| HALAD-344 | w/w % | 0.4% | 0.4% | 0.4% |
| SSA-1 | w/w % | 56.3% | 59.6% | 66.2% |
| Class-G cement | w/w % | 6.3% | 6.6% | — |
| Results | | | | |
| Temperature | ° C. | 150 | 150 | 150 |
| Initial permeability | mD | 266 | 750 | 750 |
| Max Squeeze Pressure | bar | 60 | 60 | 60 |
| Max Flow back pressure | bar | 140 | 180 | 180 |
| Kfinal/Kinitial | % | 0.1% | 0.002% | 0.012% |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore, comprising:
   (a) preparing a sealant composition comprising crosslinkable material, a crosslinking agent, a fluid loss control additive, and water,
   (b) placing the sealant composition in a permeable zone in the wellbore; and
   (c) allowing the sealant composition to set,
   wherein the crosslinkable material and crosslinking agent interact to form a gel for effecting zonal isolation of a subterranean formation; wherein an amount of the crosslinkable material present in the sealant composition is in the range of from about 1% to about 5% by weight of the sealant composition; and wherein an amount of the crosslinking agent is in a range of from about 0.05% to about 5% by weight of the sealant composition.

2. The method of claim 1, wherein a gel time of the sealant composition is in a range of from about 4 hours to about 12 hours when the sealant composition is exposed to ambient temperatures in the wellbore.

3. The method of claim 1 wherein the sealant composition further comprises cement present in an amount in a range of from greater than 0% to about 50% by weight of the sealant composition.

4. The method of claim 3, wherein step (b) is performed using a squeeze cementing technique.

5. The method of claim 3, wherein the fluid loss control additive comprises a copolymer of acrylamido-2-methylpropanesulfonate and N,N dimethylacrylamide and particulate matter comprising silica flour, silica fume, sodium silicate, microfine sand, iron oxides, manganese oxides, barite, calcium carbonate, ground nut shells, ground wood, ground corncobs, mica, ceramics, ground tires, ground glass, ground drill cutting, or combinations thereof.

6. The method of claim 1, wherein the crosslinkable material comprises a water soluble copolymer of a non-acidic ethylenically unsaturated polar monomer and a copolymerizable ethylenically unsaturated ester; a water soluble terpolymer or tetrapolymer of an ethylenically unsaturated polar monomer, an ethylenically unsaturated ester, and a monomer selected from acrylamide-2-methylpropane sulfonic acid, N-vinylpyrrolidone, or both; or combinations thereof; and wherein the crosslinking agent comprises a polyalkyleneimine, a polyfunctional aliphatic amine, an aralkylamine, a heteroaralkylamine, or combinations thereof.

7. The method of claim 6, wherein an amount of the crosslinking agent is in a range of from about 0.1% to about 5% by weight of the sealant composition.

8. The method of claim 1, wherein the crosslinkable material comprises a water soluble hydroxy unsaturated carbonyl monomer, a water soluble vinyl monomer, or combinations thereof; and wherein the crosslinking agent comprises an azo compound, a free radical initiator, a multifunctional vinyl monomer, or combinations thereof.

9. The method of claim 8, wherein an amount of the crosslinking agent is in a range of from about 0.05% to about 2% by weight of the sealant composition.

10. The method of claim 1, wherein the crosslinkable material comprises 2-hydroxy ethyl acrylate monomer and the crosslinking agent comprises an azo compound.

11. The method of claim 1, wherein the crosslinkable material comprises a copolymer of acrylamide and t-butyl acrylate and the crosslinking agent comprises polyethylene imine.

12. The method of claim 1, wherein an amount of the water present in the sealant composition is in a range of from about 25% to about 75% by weight of the sealant composition.

13. The method of claim 1, wherein the fluid loss control additive comprises particulate matter, a polymer, or combinations thereof.

14. The method of claim 13, wherein the fluid loss control additive comprises a polymer fluid loss control additive in a range of from about 0.1% to about 3% by weight of the sealant composition, a particulate fluid loss control additive in a range of from about 30% to about 70% by weight of the sealant composition, or both.

15. The method of claim 1, wherein the fluid loss control additive comprises natural polysaccharides; derivatized polysaccharides; galactomannan gums; guar gum; guar derivatives; biopolymers; modified cellulose; a copolymer of acrylamido-2-methyipropanesulfonate and N,N dimethylacrylamide and particulate matter comprising silica flour, silica fume, sodium silicate, microfine sand, iron oxides, manganese oxides, barite, calcium carbonate, ground nut shells, ground wood, ground corncobs, mica, ceramics, ground tires, ground glass, ground drill cutting, or combinations thereof; or combinations thereof.

16. The method of claim 1, wherein the sealant composition further comprises a clay stabilizer for inhibiting damage to a subterranean fonnation penetrated by the wellbore.

17. The method of claim 1, wherein the sealant composition comprises a formate compound for reducing a gel time of the crosslinkable material.

18. The method of claim 17, wherein the formate compound comprises ammonium formate, lithium formate, sodium formate, potassium formate, rubidium formate, cesium formate, francium formate, or combinations thereof.

19. The method of claim 1, wherein the sealant composition further comprises a gel retarder comprised of a chemical compound that is capable of acetylating an organic amine, hydrolyzing, thermolyzing, or combinations thereof, to produce one or more acids in said composition.

20. The method of claim 19, wherein the gel retarder comprises at least one member selected from the group consisting of anhydrides, esters, amides and polyamides, imides, polyacids and their salts.

21. The method of claim 1, wherein the sealant composition further comprises a latex comprising a styrene/butadiene copolymer suspended in water.

22. A method of servicing a wellbore, comprising:
(a) preparing a sealant composition by combining a crosslinkable material, a crosslinking agent, a fluid loss control additive, water, and a cement, wherein an amount of the cement is reduced to an effective amount to increase a gel time of the sealant composition to greater than or equal to about 4 hours when the sealant composition is exposed to ambient temperatures in the wellbore;
(b) placing the sealant composition in a permeable zone in the wellbore; and
(c) allowing the sealant composition to gel,
wherein the crosslinkable material and crosslinking agent interact to form a gel for effecting zonal isolation of a subterranean formation; wherein an amount of the crosslinkable material present in the sealant composition is in the range of from about 1% to about 5% by weight of the sealant composition; and wherein an amount of the crosslinking agent is in a range of from about 0.05% to about 5% by weight of the sealant composition.

* * * * *

UNITED STATES PATENT AND TRADEMARK OFFICE
CERTIFICATE OF CORRECTION

PATENT NO. : 7,267,174 B2
APPLICATION NO. : 11/041577
DATED : September 11, 2007
INVENTOR(S) : Jan Gronsveld et al.

It is certified that error appears in the above-identified patent and that said Letters Patent is hereby corrected as shown below:

On the Title Page, item (75), first line, replace "Jan Gonsveld" with --Jan Gronsveld--.

On the Title Page, item (75), first and second lines, replace "Fred Arkestiejn" with --Fred Arkesteijn--.

Signed and Sealed this

Seventeenth Day of June, 2008

JON W. DUDAS
*Director of the United States Patent and Trademark Office*